(12) United States Patent
Hagimoto et al.

(10) Patent No.: US 11,926,386 B2
(45) Date of Patent: Mar. 12, 2024

(54) STRADDLE TYPE VEHICLE

(71) Applicant: HONDA MOTOR CO., LTD., Tokyo (JP)

(72) Inventors: Masashi Hagimoto, Wako (JP); Yoshiyuki Kuroba, Wako (JP); Hiroshi Maeda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 827 days.

(21) Appl. No.: 17/021,217

(22) Filed: Sep. 15, 2020

(65) Prior Publication Data

US 2020/0407002 A1 Dec. 31, 2020

Related U.S. Application Data

(63) Continuation of application No. PCT/JP2018/013426, filed on Mar. 29, 2018.

(51) Int. Cl.
*G06T 15/00* (2011.01)
*B62J 45/412* (2020.01)
(Continued)

(52) U.S. Cl.
CPC .............. *B62J 50/22* (2020.02); *B62J 45/412* (2020.02); *B62J 50/225* (2020.02); *G01C 21/26* (2013.01)

(58) Field of Classification Search
CPC ... G01C 21/3697; G01C 21/26; B60W 50/14; B60W 30/16; B62J 50/22; B62J 45/412;
(Continued)

(56) References Cited

U.S. PATENT DOCUMENTS 5,547,382 A * 8/1996 Yamasaki ................ G09B 9/05
348/121
9,898,006 B2 * 2/2018 Takahashi ............ G05D 1/0088
(Continued)

FOREIGN PATENT DOCUMENTS

JP 2002140800 A 5/2002
JP 2002219970 A 8/2002
(Continued)

OTHER PUBLICATIONS

Gao C, He Z, Wang W. Electric motorcycle control system based on GPS and CAN technology. In2016 Sixth International Conference on Instrumentation & Measurement, Computer, Communication and Control (IMCCC) Jul. 2, 20161 (pp. 945-950). IEEE.*
(Continued)

*Primary Examiner* — Phu K Nguyen
(74) *Attorney, Agent, or Firm* — Thomas| Horstemeyer, LLP (57) ABSTRACT

A straddle type vehicle comprising: a first display unit configured to display speed information of the straddle type vehicle; and a second display unit configured to display information concerning automatic traveling control of the straddle type vehicle, wherein the first display unit and the second display unit are arranged on a front side of the vehicle with respect to a head pipe of the straddle type vehicle, in the first display unit, a display position of the vehicle speed information changes linearly or in a curve in accordance with a change in a speed of the straddle type vehicle, and the second display unit is arranged to be adjacent in an upward direction or a left-and-right direction of the display position of the speed information on a high speed range side of the first display unit.

5 Claims, 6 Drawing Sheets

(51) Int. Cl.
B62J 50/22 (2020.01)
B62J 50/21 (2020.01)
G01C 21/26 (2006.01)

(58) Field of Classification Search
CPC ............ B62J 50/225; G01S 2013/9319; G01S 2013/93271; G01S 13/931
USPC .......................................................... 345/418
See application file for complete search history.

(56) References Cited

U.S. PATENT DOCUMENTS

| | | | |
|---|---|---|---|
| 11,332,072 B2 * | 5/2022 | Tanaka | H04R 1/32 |
| 11,505,273 B2 * | 11/2022 | Kaita | B62J 17/04 |
| 2009/0171546 A1 | 7/2009 | Tozuka et al. | |
| 2012/0268262 A1 * | 10/2012 | Popovic | G02B 27/01 |
| | | | 340/438 |
| 2013/0002418 A1 * | 1/2013 | Nakamura | B62J 50/22 |
| | | | 340/441 |
| 2020/0384916 A1 * | 12/2020 | Tanaka | H04R 1/32 |
| 2021/0192942 A1 * | 6/2021 | Koga | G08G 1/0129 |

FOREIGN PATENT DOCUMENTS

| | | |
|---|---|---|
| JP | 2006098092 A | 4/2006 |
| JP | 2008310766 A | 12/2008 |
| JP | 2009154713 A | 7/2009 |
| JP | 2013103663 A | 5/2013 |
| JP | 2013208954 A | 10/2013 |
| JP | 2017128200 A | 7/2017 |
| WO | 2019186951 A1 | 10/2019 |

OTHER PUBLICATIONS

Jimenez F, Naranjo JE, Anaya JJ, Garcia F, Ponz A, Armingol JM. Advanced driver assistance system for road environments to improve safety and efficiency. Transportation research procedia. Jan. 1, 2016;14:2245-54.*
Bayly M, Regan MA, Hosking SG. Intelligent transport systems and motorcycle safety. Monash University Accident Research Centre; Jul. 2006.*
International Search Report for PCT/JP2018/013426 dated Jun. 12, 2018.
IPRP for PCT/JP2018/013426 mailed Jun. 8, 2020.

* cited by examiner

STRADDLE TYPE VEHICLE

CROSS-REFERENCE TO RELATED APPLICATION

This application is a continuation of International Patent Application No. PCT/JP2018/013426 filed on Mar. 29, 2018, the entire disclosures of which is incorporated herein by reference.

BACKGROUND OF THE INVENTION

Field of the Invention

The present invention relates to a straddle type vehicle.

Description of the Related Art

Japanese Patent Laid-Open No. 2002-219970 discloses a four-wheel vehicle having an ACC (Adaptive Cruise Control) function and including a display unit that displays its information.

If the ACC function is applied to a straddle type vehicle, the driver needs a balancing operation of the vehicle, and needs to correctly recognize automatic traveling information concerning constant-speed traveling or following traveling in a short time because the distance interval to a peripheral vehicle is short as compared to a four-wheel vehicle, and the traffic environment frequently changes.

However, in the conventional technique, it is difficult for the driver of a straddle type vehicle to early correctly recognize automatic traveling information.

It is an object of the present invention to provide a technique for allowing the driver of a straddle type vehicle to early recognize automatic traveling information.

SUMMARY OF THE INVENTION

According to the present invention, there is provided a straddle type vehicle comprising: a vehicle speed information display unit configured to display speed information of the straddle type vehicle; and an automatic traveling information display unit configured to display information concerning automatic traveling control of the straddle type vehicle, wherein the vehicle speed information display unit and the automatic traveling information display unit are arranged on a front side of the vehicle with respect to a head pipe of the straddle type vehicle, in the vehicle speed information display unit, a display position of the vehicle speed information changes linearly or in a curve in accordance with a change in a speed of the straddle type vehicle, and the automatic traveling information display unit is arranged to be adjacent in an upward direction or a left-and-right direction of the display position of the speed information on a high speed range side of the vehicle speed information display unit.

Further features of the present invention will become apparent from the following description of exemplary embodiments (with reference to the attached drawings).

Note that the same reference numerals denote the same or like components throughout the accompanying drawings.

BRIEF DESCRIPTION OF THE DRAWINGS

The accompanying drawings, which are incorporated in and constitute a part of the specification, illustrate embodiments of the invention and, together with the description, serve to explain principles of the invention.

DESCRIPTION OF THE EMBODIMENTS

Hereinafter, an embodiment of the present invention will be described with reference to the accompanying drawings. Note that the same reference numerals denote the same constituent elements throughput the drawings. In this specification, expressions "front", "rear", "upper", and "lateral side (left/right)" are sometimes used, and these are used as expressions representing relative directions with respect to a vehicle. For example, "front" represents the front side in the longitudinal direction of a vehicle, and "upper" represents the height direction of the vehicle.

Figure 1:
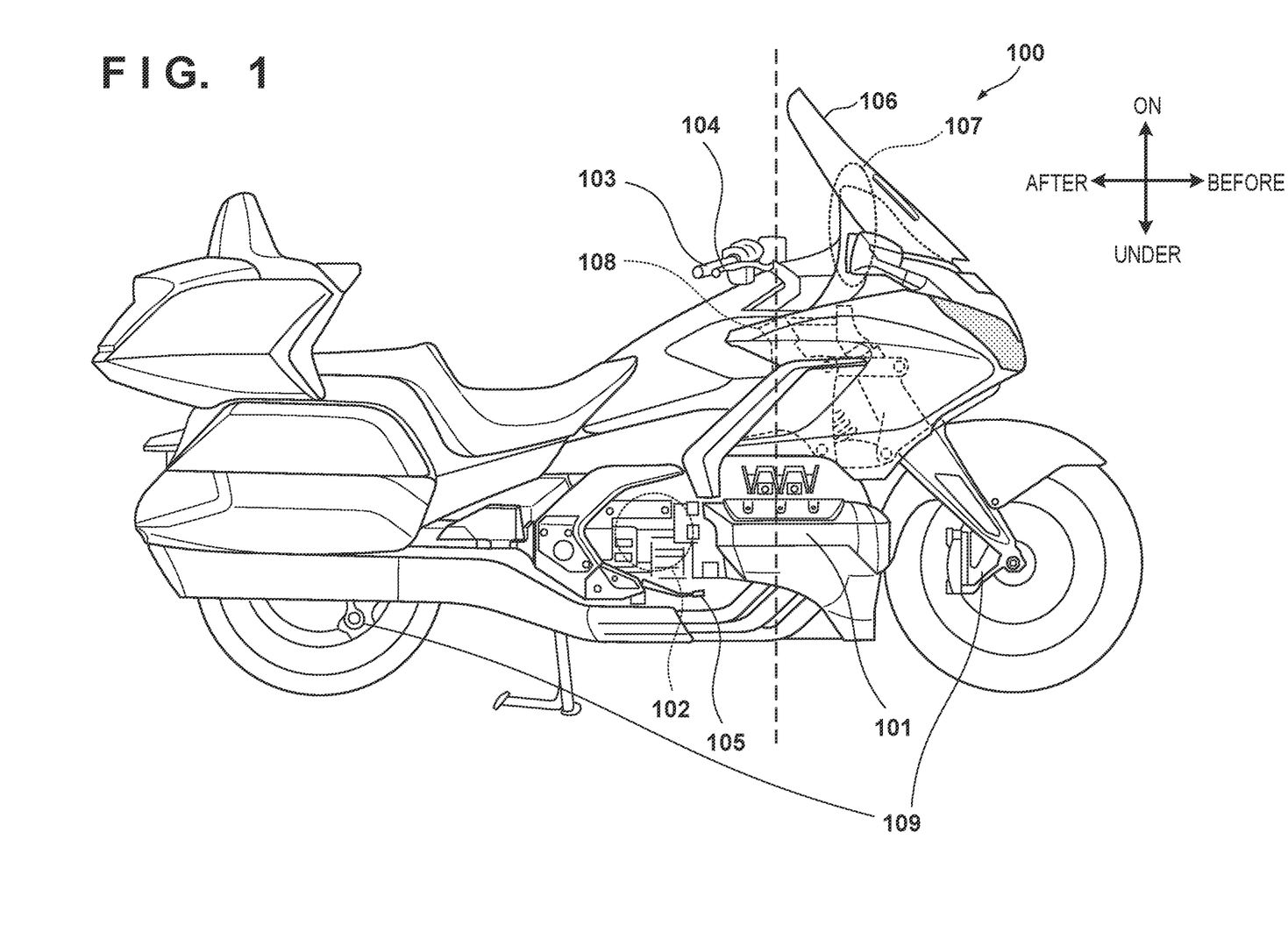
FIG. 1 is a view showing the outer appearance of a straddle type vehicle (motorcycle) according to an embodiment of the present invention.

FIG. 1 is a view showing the outer appearance of a motorcycle 100 that is an example of a straddle type vehicle to which the present invention can be applied. The motorcycle 100 includes an engine 101, a transmission 102, a steering handlebar 103, a front wheel brake lever 104, a rear wheel brake pedal 105, a windshield 106, a meter unit 107, a head pipe 108, and a brake device 109. The output of the engine 101 is transmitted to the transmission 102 via a clutch (not shown). The transmission 102 is a transmission having a plurality of gear ranges (for example, six or seven gear ranges). The output of the transmission 102 is transmitted to the rear wheel via a transmission mechanism (not shown) such as a propeller shaft.

The driver can accelerate by the throttle operation of the steering handlebar 103. Also, by operating the front wheel brake lever 104 and/or the rear wheel brake pedal 105, the brake device 109 can be controlled via an actuator (not shown) to do braking. Note that when executing an ACC (Adaptive Cruise Control: inter-vehicle distance control/vehicle speed control (constant-speed traveling control)) function, driving is performed such that the engine 101, the transmission 102, the brake device 109, and the like are automatically controlled to maintain a set inter-vehicle distance or a set vehicle speed.

The windshield 106 is a windbreak shield covering the front side of the driver, and is made of, for example, a glass member. The meter unit 107 includes various kinds of information display units including a speed meter and a tachometer to be described later. The head pipe 108 is provided on the vehicle front side of a frame (not shown) and steerably supports the steering handlebar 103. The meter unit 107 is provided on the vehicle front side (front side) of the head pipe 108.

Figure 2:
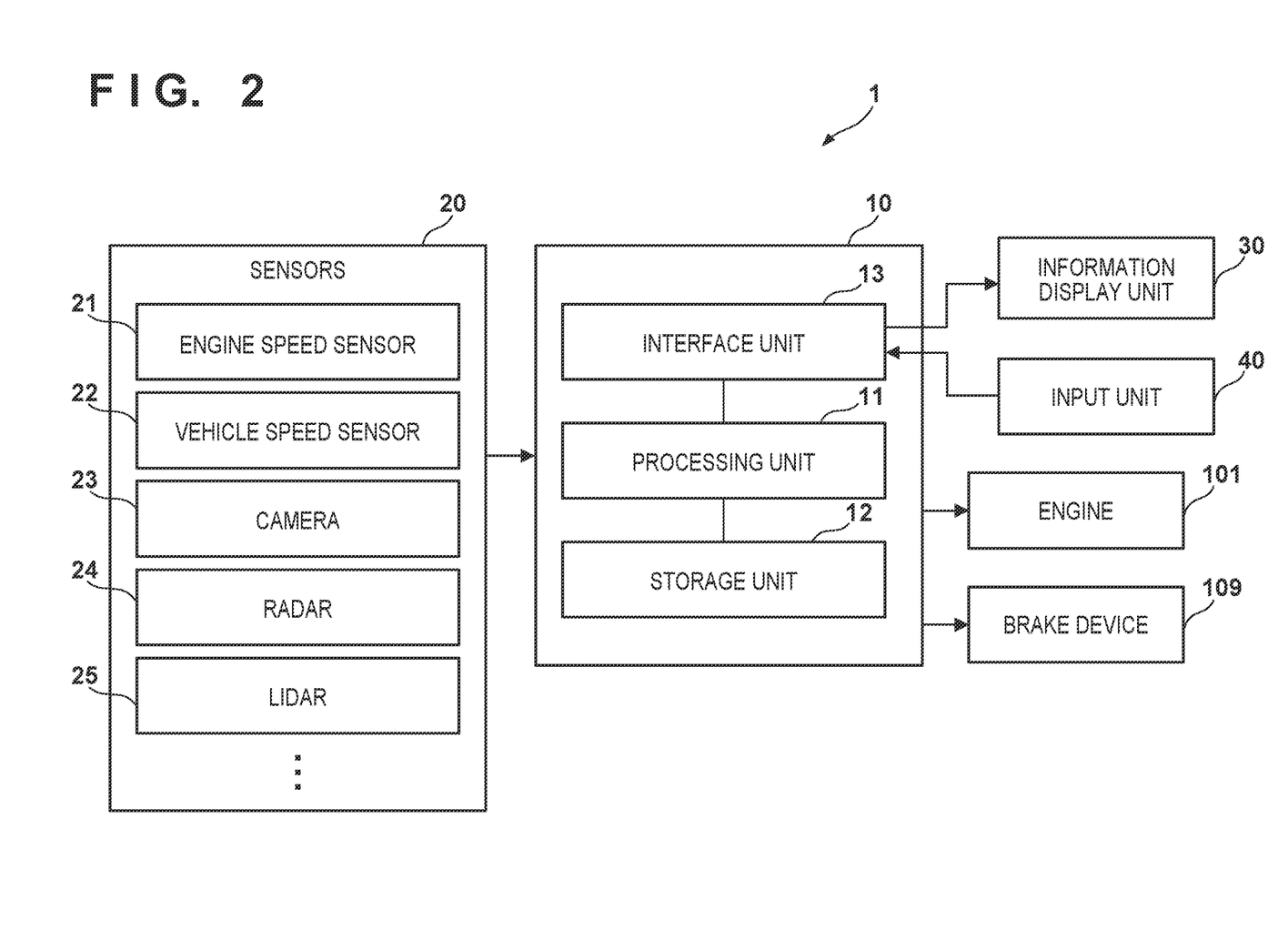
FIG. 2 is a block diagram of a control apparatus according to an embodiment of the present invention.

FIG. 2 is a block diagram of a control apparatus 1 according to an embodiment of the present invention. The control apparatus 1 includes a control unit 10. The control unit 10 includes a processing unit 11 such as a CPU, a storage unit 12 such as a RAM or a ROM, and an interface unit 13 that connects an external device and the processing unit 11. The interface unit 13 is connected to an information display unit 30 and an input unit 40. The information display unit 30 displays various kinds of information to be described later to the driver. The input unit 40 accepts input of various kinds of information based on an operation of the driver. The input unit 40 includes, for example, an inter-vehicle distance setting switch (not shown), a cruise control switch (not shown), and the like. Setting of inter-vehicle distance control is done by the inter-vehicle distance setting switch, and setting of vehicle speed control (constant-speed traveling control) is done by the cruise control switch. The information of the set vehicle speed or set inter-vehicle distance can freely be selected and input by the driver. Set vehicle speed information is information set to make the motorcycle 100 travel at a constant speed. Set inter-vehicle distance information is information set to maintain the inter-vehicle distance between the motorcycle 100 and a preceding vehicle of the motorcycle 100 at a predetermined distance.

The processing unit 11 executes a program stored in the storage unit 12 to control the engine 101 and/or the brake device 109 based on the driving operation of the driver and/or the detection results of various kinds of sensors 20 and also control the display contents of the information display unit 30. The various kinds of sensors 20 include an engine speed sensor 21, a vehicle speed sensor 22, a camera 23, a radar 24, and/or a LiDAR (Light Detection and Ranging (LiDAR)) 25.

The engine speed sensor 21 is a sensor that detects the number of rotations of the engine 101. The vehicle speed sensor 22 detects the vehicle speed of the motorcycle 100. The camera 23 is, for example, an image capturing device using a CCD/CMOS image sensor. The radar 24 is, for example, a distance measuring device such as a millimeter wave radar. The LiDAR 25 is, for example, a distance measuring device such as a laser radar. These are arranged at positions where the peripheral information of the motorcycle 100 can be detected, for example, on the front side, the rear side, the upper side, and/or the lateral side of the vehicle. The ACC function can be executed based on the detected peripheral information.

For example, when the ACC function is used, in a case in which no preceding vehicle is detected, constant-speed traveling control can be performed such that the vehicle travels while keeping a preset vehicle speed by controlling acceleration/deceleration. Additionally, in a case in which a preceding vehicle is detected, automatic traveling control can be performed such that the vehicle travels while keeping an inter-vehicle distance set in advance by the driver with respect to the preceding vehicle by controlling acceleration/deceleration.

Figure 3:
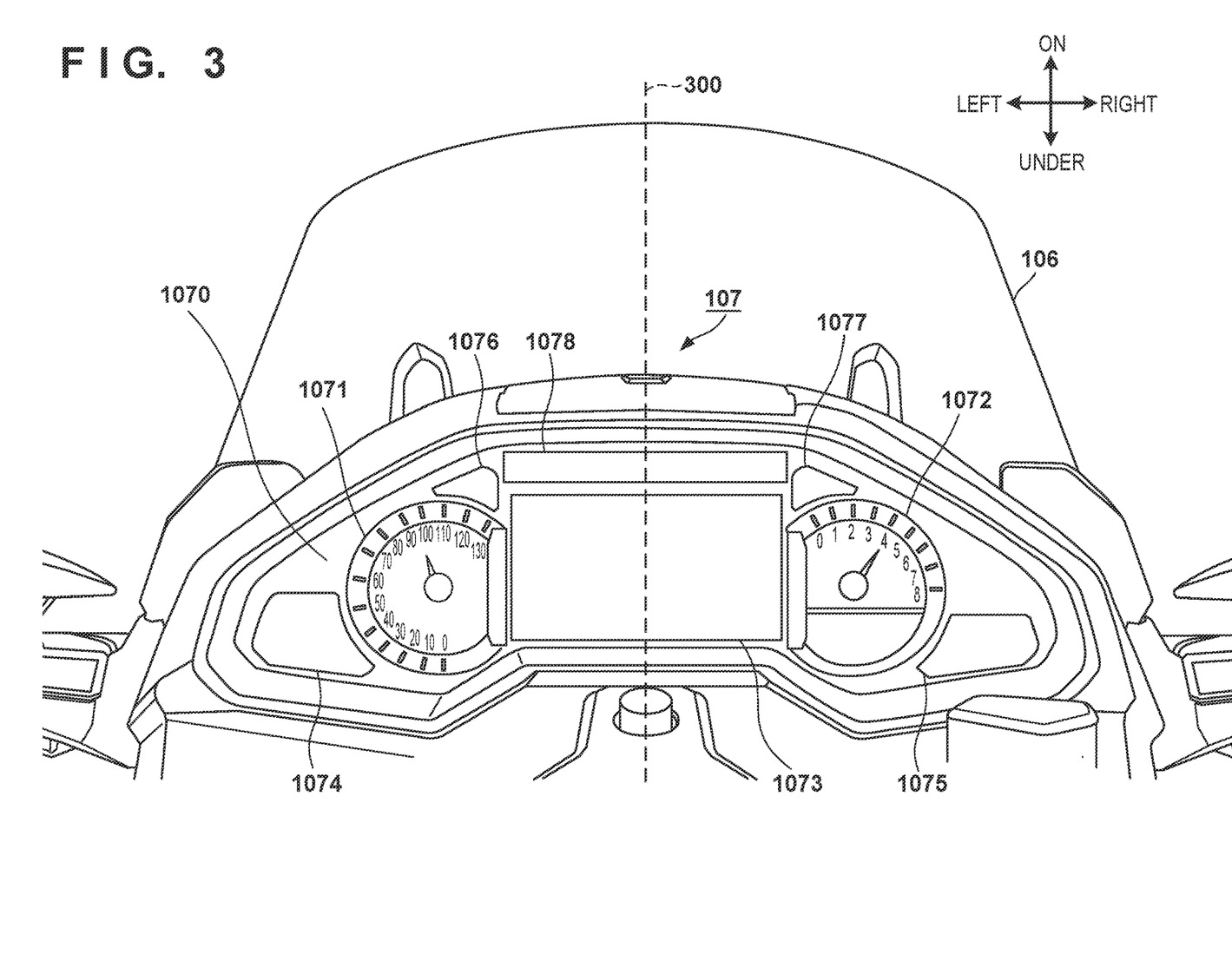
FIG. 3 is a plan view of a meter unit viewed from the side of the driver seat of the straddle type vehicle (motorcycle) according to an embodiment of the present invention.

FIG. 3 is a plan view of the meter unit 107 viewed from the side of the driver seat of the straddle type vehicle (motorcycle 100) according to an embodiment of the present invention. Reference numeral 300 in FIG. 3 represents the center line of the straddle type vehicle in the vehicle width direction. A display panel 1070 of the meter unit 107 is an example of the information display unit 30, and is provided with a speed meter (vehicle speed information display unit) 1071, a tachometer 1072, a navigation information display unit 1073, and automatic traveling information display units 1074 to 1078. As described with reference to FIG. 1, the meter unit 107 is arranged on the front side of the vehicle with respect to the head pipe 108. Hence, the automatic traveling information display units are also arranged on the front side of the vehicle with respect to the head pipe 108. When information concerning automatic traveling control is displayed on the front side of the head pipe, the driver can acquire the information in a short time, and it is possible to provide a satisfactory driving environment even under an ACC environment.

The speed meter (vehicle speed information display unit) 1071 displays the speed of the straddle type vehicle (motorcycle 100) detected by the vehicle speed sensor 22. In the example shown in FIG. 3, the speed meter 1071 is configured to change the display position of vehicle speed information in a curve (arc) in accordance with a change in the speed of the motorcycle 100. However, the change may be not a curve but linear.

The tachometer 1072 is a measuring instrument that measures/displays the number of rotations of the engine 101 detected by the engine speed sensor 21. In the example shown in FIG. 3, it is possible to measure a speed of 0 to 8,000 r/min. The navigation information display unit 1073 displays various kinds of navigation information used to guide traveling up to a destination.

Information concerning automatic traveling control of the straddle type vehicle (motorcycle 100) according to this embodiment is displayed on at least one of the automatic traveling information display units 1074 to 1078. The information concerning automatic traveling control includes information of a set inter-vehicle distance and/or a set vehicle speed when performing traveling by ACC control.

The automatic traveling information display unit 1074 is arranged to be adjacent in the leftward direction of the speed meter (vehicle speed information display unit) 1071. The automatic traveling information display unit 1075 is arranged to be adjacent in the rightward direction of the tachometer 1072. The automatic traveling information display unit 1076 is arranged to be adjacent in the upward direction or the left-and-right direction of the speed meter (vehicle speed information display unit) 1071 (in the upward direction in the example shown in FIG. 3). In particular, the automatic traveling information display unit 1076 is arranged to be adjacent in the upward direction or the left-and-right direction (in the upward direction in the example shown in FIG. 3) of the display position of speed information on the high speed range side of the speed meter (vehicle speed information display unit) 1071. The automatic traveling information display unit 1077 is arranged to be adjacent on the upper side of the tachometer 1072. The automatic traveling information display unit 1078 is arranged to be adjacent on the upper side of the navigation information display unit 1073, and is arranged in a rectangular shape extending in the left-and-right direction along the edge of the display panel 1070.

Since automatic traveling information is displayed at a position adjacent to the speed meter (vehicle speed information display unit) 1071, like the automatic traveling information display unit 1074 or the automatic traveling information display unit 1076, it is possible to efficiently visually recognize ACC-associated information and provide a satisfactory driving environment.

In addition, when display is performed on the automatic traveling information display unit 1076, it is possible to efficiently visually recognize the current sped and the automatic traveling information in the high speed range of the speed meter (vehicle speed information display unit) 1071 and provide a satisfactory driving environment.

Since display is performed on the automatic traveling information display unit 1078 having a horizontally long rectangular shape, automatic traveling information can efficiently be arranged in the limited display panel (meter region) 1070 of the motorcycle. It is therefore possible to prevent the meter device from becoming bulky. In addition, at least a part of the automatic traveling information display unit may be configured to overlap the center line 300 of the straddle type vehicle in the vehicle width direction. This can improve the visibility.

Figure 4:
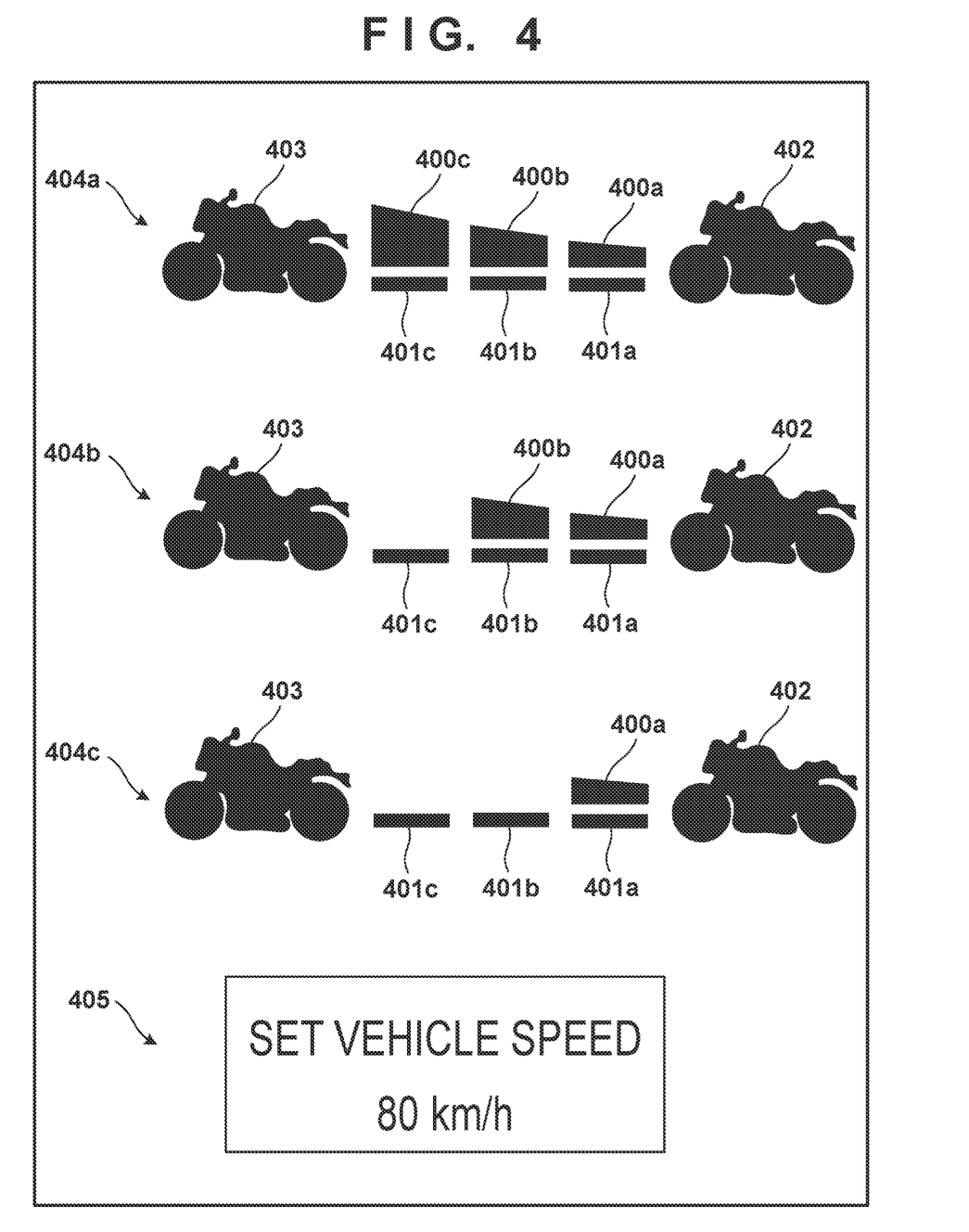
FIG. 4 is a view showing an example of information concerning automatic traveling control according to an embodiment of the present invention.

As an example of information concerning automatic traveling control, a display example of information of a set inter-vehicle distance and a set vehicle speed will be described here with reference to FIG. 4. When the ACC function is started by the operation of the driver, inter-vehicle distance information can be displayed. At this time, set inter-vehicle distance information currently set by the driver is displayed.

Three trapezoidal blocks 400*a*, 400*b*, and 400*c* are arranged in series between a self-vehicle symbol 402 on the right side and a preceding vehicle symbol 403 on the left side, and three rod-shaped subblocks 401*a*, 401*b*, and 401*c* having the same length as the blocks 400*a*, 400*b*, and 400*c* are arranged in series along the lower portions of the three blocks 400*a*, 400*b*, and 400*c*. The information of the set inter-vehicle distance information is expressed by changing their display forms.

When the ACC function is working, the self-vehicle symbol 402 and the three subblocks 401*a*, 401*b*, and 401*c* are in an always displayed state. However, the display states of the three blocks 400*a*, 400*b*, and 400*c* change in accordance with the set inter-vehicle distance. More specifically, if the inter-vehicle distance is "long", all the three blocks 400*a*, 400*b*, and 400*c* are in a displayed state (404*a*). If the inter-vehicle distance is "medium", the block 400*a* on the right side and the block 400*b* at the center are in the displayed state, and the left block 400*c* is in a non-displayed state (404*b*). If the inter-vehicle distance is "short", only the block 400*a* on the right side is in the displayed state, and the blocks 400*b* at the center and the left block 400*c* are in the non-displayed state (404*c*). Note that an example in which the inter-vehicle distances are set in three stages has been described here. The number of stages can be arbitrary if there are a plurality of stages.

If a preceding vehicle is detected, and automatic following control is performed, the preceding vehicle symbol 403 is displayed in addition to the self-vehicle symbol 402, and current set vehicle speed information 405 is further displayed. The set vehicle speed information 405 is vehicle speed information input and set by the driver via the input unit 40. If a preceding vehicle is not detected, constant-speed traveling control at the set vehicle speed is performed.

Figure 5:
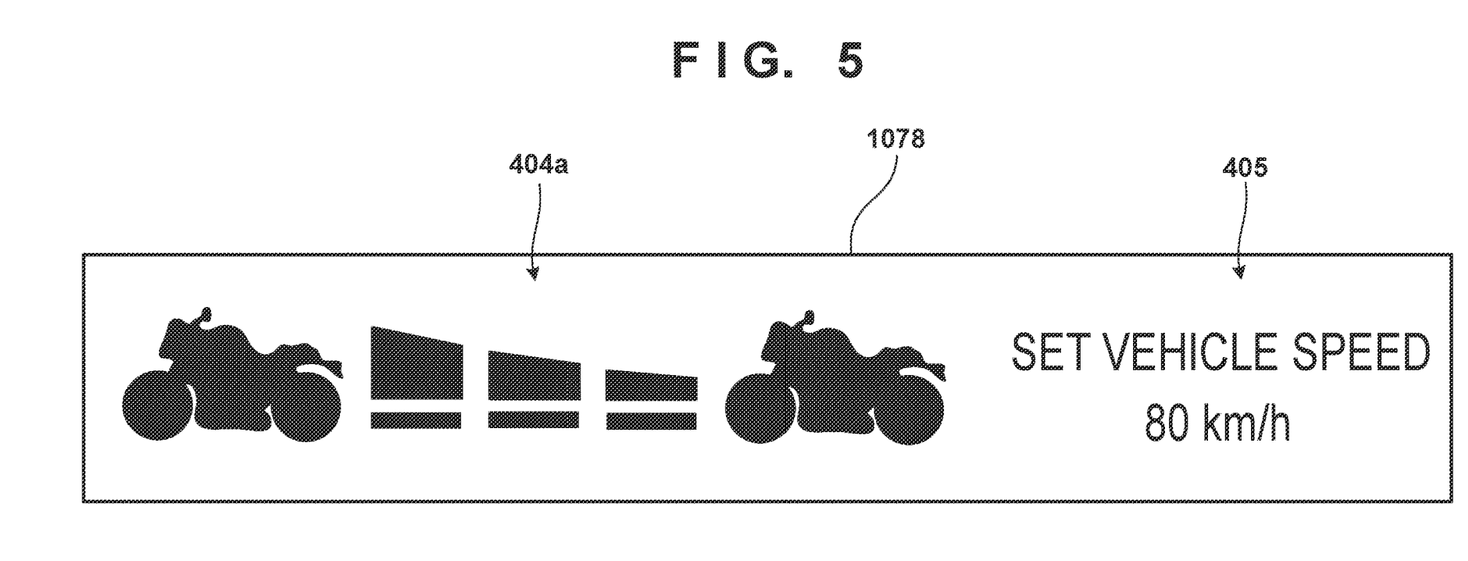
FIG. 5 is a view showing an example of the display form of information concerning automatic traveling control according to an embodiment of the present invention.
Figure 6:
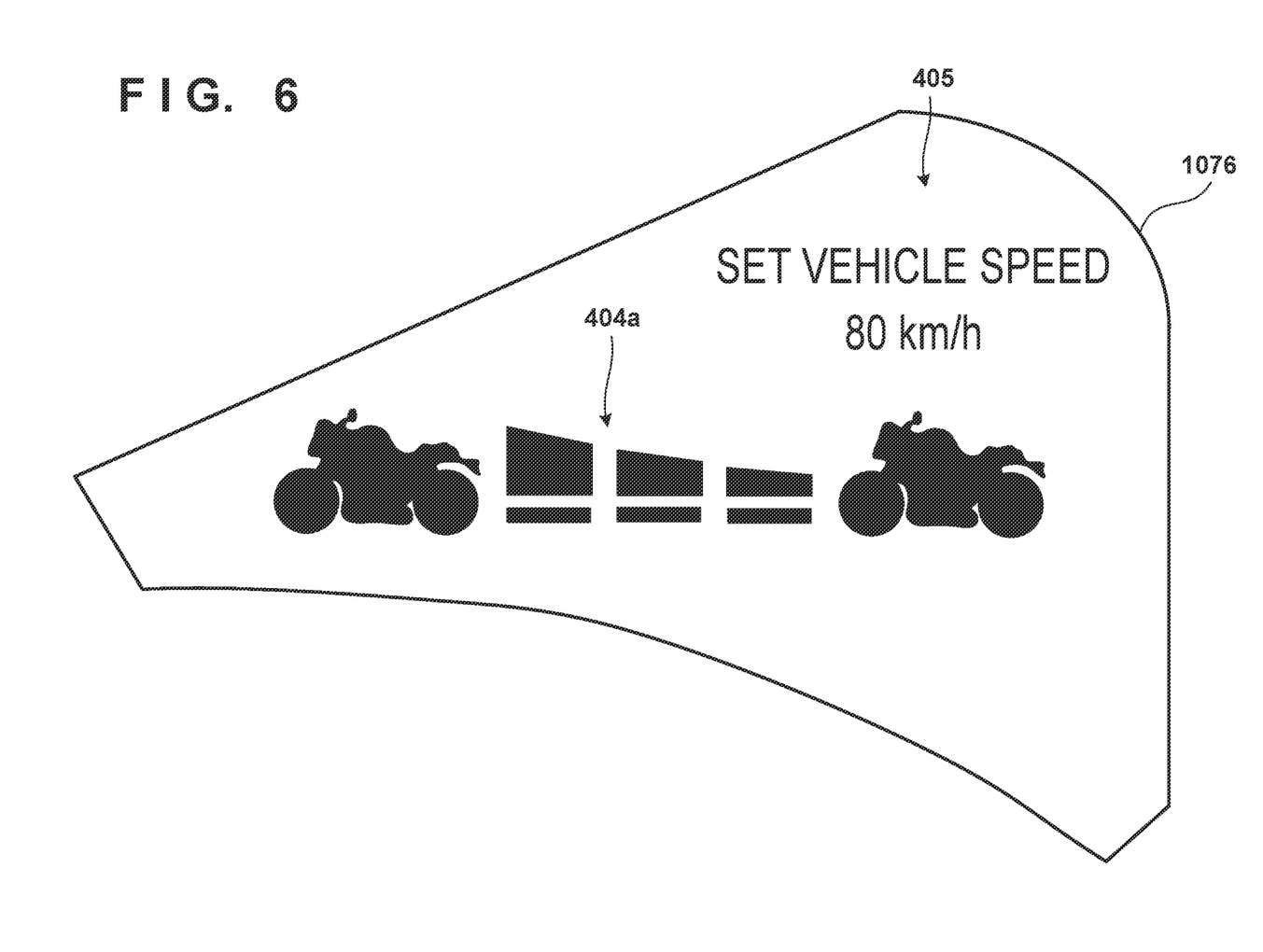
FIG. 6 is a view showing an example of the display form of information concerning automatic traveling control according to an embodiment of the present invention.

The display form of information concerning automatic traveling control will be described next with reference to FIGS. 5 and 6. FIG. 5 shows an example in which information is displayed on the automatic traveling information display unit 1078, and FIG. 6 shows an example in which information is displayed on the automatic traveling information display unit 1076. Since the automatic traveling information display unit 1078 has a horizontally long rectangular shape, information 404*a* of the set inter-vehicle distance is arranged in the left-and-right direction, and the set vehicle speed information 405 is arranged to be adjacent in the left-and-right direction. Additionally, since the automatic traveling information display unit 1076 does not have a rectangular shape, the information 404*a* of the set inter-vehicle distance is displayed on the lower side, and the set vehicle speed information 405 is displayed on the upper side. These upper display positions may be reversed. That is, the information 404*a* of the set inter-vehicle distance may be displayed on the upper side, and the set vehicle speed information 405 may be displayed on the lower side.

Note that FIGS. 5 and 6 show display examples of the information 404*a* in which the set inter-vehicle distance is "long". Information 404*b* or 404*c* is displayed in accordance with the set inter-vehicle distance "medium" or "short", as a matter of course.

In the above-described embodiment, an example in which both the set vehicle speed information and the set inter-vehicle distance information are displayed in one automatic traveling information display unit has been described. However, the present invention is not limited to this. For example, the set vehicle speed information may be displayed on the automatic traveling information display unit 1076 close to the high speed range of the speed meter (vehicle speed information display unit) 1071, and the set inter-vehicle distance information may be displayed on the automatic traveling information display unit 1078 having a horizontally long rectangular shape. This can facilitate comparison/confirmation of the current vehicle speed and the set vehicle speed. Additionally, since the set inter-vehicle distance is arranged at a position to easily confirm the state of the preceding vehicle traveling on the front side of the vehicle, comparison/confirmation of the set inter-vehicle distance and the actual distance between the preceding vehicle and the self-vehicle can easily be performed.

According to a first aspect of the present invention, there is provided a straddle type vehicle (100) characterized by comprising:

a vehicle speed information display unit (1071) configured to display speed information of the straddle type vehicle (100); and an automatic traveling information display unit (1074, 1075, 1076, 1077, 1078) configured to display information concerning automatic traveling control of the straddle type vehicle, wherein the vehicle speed information display unit and the automatic traveling information display unit are arranged on a front side of the vehicle with respect to ahead pipe (108) of the straddle type vehicle.

In the straddle type vehicle according to a second aspect of the present invention, the automatic traveling information display unit (1074, 1076) is arranged to be adjacent in the upward direction or the left-and-right direction of the vehicle speed information display unit.

In the straddle type vehicle according to a third aspect of the present invention, in the vehicle speed information display unit, a display position of the vehicle speed information changes linearly or in a curve in accordance with a change in a speed of the straddle type vehicle, and the automatic traveling information display unit (1076) is arranged to be adjacent in an upward direction or a left-and-right direction of the display position of the speed information on a high speed range side of the vehicle speed information display unit.

The straddle type vehicle according to a fourth aspect of the present invention further comprises a display panel (1070) including the vehicle speed information display unit and the automatic traveling information display unit, wherein the automatic traveling information display unit (1078) is arranged along an edge of the display panel.

In the straddle type vehicle according to a fifth aspect of the present invention, the automatic traveling information display unit (1078) is arranged along an upper edge of the display panel.

In the straddle type vehicle according to a sixth aspect of the present invention, at least a part of the automatic traveling information display unit overlaps a center line (300) of the straddle type vehicle (100) in a vehicle width direction.

The straddle type vehicle according to a seventh aspect of the present invention further comprises a navigation information display unit (1073) configured to display navigation information, wherein the automatic traveling information display unit (1078) is arranged to be adjacent on an upper side of the navigation information display unit.

In the straddle type vehicle according to an eighth aspect of the present invention, the information concerning the automatic traveling control includes set vehicle speed information (405) set to make the straddle type vehicle (100) travel at a constant speed.

In the straddle type vehicle according to a ninth aspect of the present invention, the information concerning the automatic traveling control includes set inter-vehicle distance information (404*a*, 404*b*, 404*c*) set to maintain an inter-vehicle distance between the straddle type vehicle (100, 402) and a preceding vehicle (403) of the straddle type vehicle at a predetermined distance.

According to a first aspect of the present invention, the driver of the straddle type vehicle can early correctly recognize automatic traveling information. In addition, since vehicle speed information and set vehicle speed information are displayed on the front side of the head pipe, it is possible to perform information acquisition in a short time and provide a satisfactory driving environment even under an ACC environment.

According to a second aspect of the present invention, since information (a set vehicle speed, a set inter-vehicle distance, and the like) concerning automatic traveling control is displayed near the speed information, ACC-associated information can efficiently visually be recognized. It is therefore possible to provide a satisfactory driving environment.

According to a third aspect of the present invention, it is possible to efficiently visually recognize the speed information and the information (a set vehicle speed, a set inter-vehicle distance, and the like) concerning automatic traveling control in the high speed range and provide a satisfactory driving environment. In addition, since the automatic traveling information display unit is arranged between the front side of the vehicle and the vehicle speed information display unit, it is possible to efficiently visually recognize the information and provide a satisfactory driving environment.

According to a fourth aspect of the present invention, since the automatic traveling information display unit can efficiently be arranged in the limited display panel region, it is therefore possible to prevent the meter unit from becoming bulky.

According to a fifth aspect of the present invention, when the automatic traveling information display unit is arranged in the frontward direction of the vehicle, it is possible to efficiently visually recognize the information and provide a satisfactory driving environment.

According to a sixth aspect of the present invention, it is possible to improve the visibility.

According to a seventh aspect of the present invention, since the automatic traveling information display unit is arranged between the front side of the vehicle and the navigation information display unit, it is possible to efficiently visually recognize the information concerning automatic traveling control when confirming navigation information and provide a satisfactory driving environment.

According to an eighth aspect of the present invention, it is possible to efficiently visually recognize the set vehicle speed information and provide a satisfactory driving environment.

According to a ninth aspect of the present invention, it is possible to efficiently visually recognize the set inter-vehicle distance information and provide a satisfactory driving environment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A straddle type vehicle comprising:
   a vehicle speed information display unit configured to display speed information of the straddle type vehicle;
   a plurality of automatic traveling information display units configured to display information concerning automatic traveling control of the straddle type vehicle; and
   a display panel including the vehicle speed information display unit and the plurality of automatic traveling information display units,
   wherein the information concerning the automatic traveling control includes i) set vehicle speed information set to make the straddle type vehicle travel at a constant speed and ii) set inter-vehicle distance information set to maintain an inter-vehicle distance between the straddle type vehicle and a preceding vehicle of the straddle type vehicle at a predetermined distance,
   wherein the vehicle speed information display unit and the plurality of automatic traveling information display units are arranged on a front side of the vehicle with respect to a head pipe of the straddle type vehicle,
   in the vehicle speed information display unit, a display position of the vehicle speed information changes linearly or in a curve in accordance with a change in a speed of the straddle type vehicle,
   wherein a first automatic traveling information display unit among the plurality of automatic traveling information display units is arranged to be adjacent in an upward direction of the display position of the speed information on a high speed range side of the vehicle speed information display unit,
   wherein a second automatic traveling information display unit among the plurality of automatic traveling information display units is arranged along an upper edge of the display panel,
   wherein the first automatic traveling information display unit and the second automatic traveling information display unit are adjacent to each other in a left-and-right direction,
   wherein the set vehicle speed information is displayed on the first automatic traveling information display unit near a high speed range of the vehicle speed information display unit, and
   wherein the set inter-vehicle distance information is displayed on the second automatic traveling information display unit having a horizontally long rectangular shape.

2. The straddle type vehicle according to claim 1, wherein a third automatic traveling information display unit among the plurality of automatic traveling information display units is arranged to be adjacent in the left-and-right direction of the vehicle speed information display unit.

3. The straddle type vehicle according to claim 1, wherein at least a part of the second automatic traveling information display unit overlaps a center line of the straddle type vehicle in a vehicle width direction.

4. The straddle type vehicle according to claim 1, further comprising a navigation information display unit configured to display navigation information,
   wherein the second automatic traveling information display unit is arranged to be adjacent on an upper side of the navigation information display unit.

5. A straddle type vehicle comprising:
   a vehicle speed information display unit configured to display speed information of the straddle type vehicle;
   a set vehicle speed information display unit configured to display set vehicle speed information set to make the straddle type vehicle travel at a constant speed;
   a set inter-vehicle distance information display unit configured to display set inter-vehicle distance information set to maintain an inter-vehicle distance between the straddle type vehicle and a preceding vehicle of the straddle type vehicle at a predetermined distance; and
   a display panel including the vehicle speed information display unit, the set vehicle speed information display unit, and the set inter-vehicle distance information display unit,
   wherein the display panel is arranged on a front side of the vehicle with respect to a head pipe of the straddle type vehicle,
   in the vehicle speed information display unit, a display position of the vehicle speed information changes linearly or in a curve in accordance with a change in a speed of the straddle type vehicle
   wherein the set vehicle speed information display unit is arranged to be adjacent in an upward direction of the display position of the speed information on a high speed range side of the vehicle speed information display unit,
   wherein the set inter-vehicle distance information display unit is arranged along an upper edge of the display panel,
   wherein the set vehicle speed information display unit and the set inter-vehicle distance information display unit are adjacent to each other in a left-and-right direction,
   wherein the set inter-vehicle distance information display unit has a horizontally long rectangular shape.

* * * * *